Figure 1:
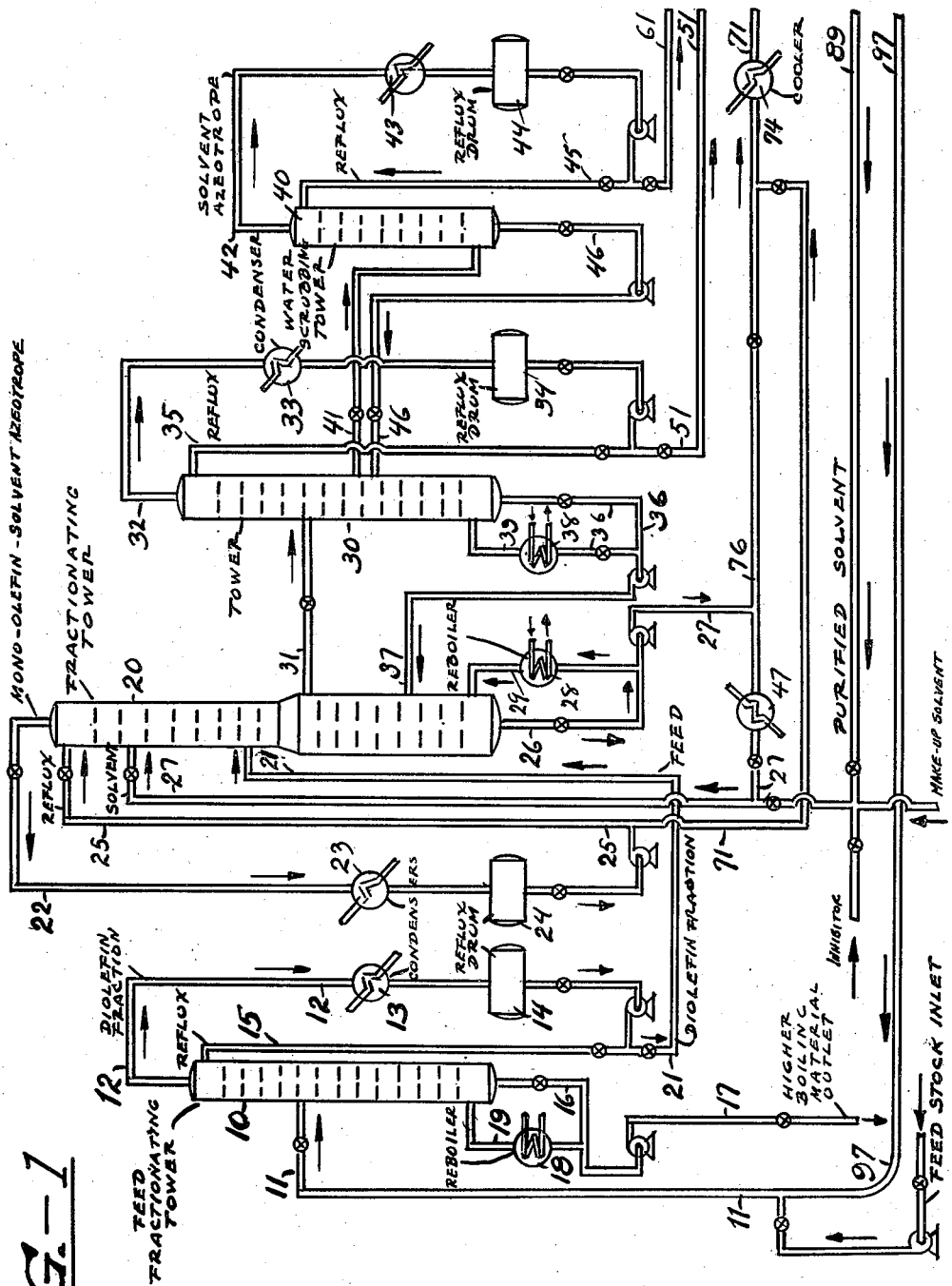

Oct. 31, 1944.  J. A. PATTERSON  2,361,493
SEPARATION AND PURIFICATION OF HYDROCARBONS
Filed Feb. 3, 1943  2 Sheets-Sheet 2

John A. Patterson Inventor
By P. L. Young Attorney

Patented Oct. 31, 1944

2,361,493

UNITED STATES PATENT OFFICE 2,361,493

SEPARATION AND PURIFICATION OF HYDROCARBONS

John A. Patterson, Westfield, N. J., assignor to Standard Oil Development Company, a corporation of Delaware Application February 3, 1943, Serial No. 474,497

9 Claims. (Cl. 202—42)

This invention relates to the treatment of mixtures of hydrocarbons of the $C_3$ to $C_8$ range, to effect the segregation and purification of paraffins, mono-olefins and diolefins. The invention relates particularly to the separation of at least two hydrocarbons of closely related properties from their admixture with other hydrocarbons.

Present day developments in the art of preparing synthetic materials from hydrocarbons have singled out the $C_4$ and $C_5$ unsaturated hydrocarbons as being particularly important basic materials. From these simple hydrocarbons, synthetic rubber is at present being prepared by polymerization processes. The separation of these compounds is, as a result, highly important. The compounds, although of wide occurrence, are present only in relatively small concentrations in easily available stocks, such as in the products of the thermal decomposition of petroleum fractions. Moreover, the problem of separating the individual compounds from their admixture with other hydrocarbons is clearly beset with many difficulties because of their closely related properties. Thus, for hydrocarbons containing 5 carbon atoms in the molecule, the boiling points at 760 mm. and the relative volatilities ($a$) (isoprene as one) which are a direct measure of the ease of separation in a distillation system, are as follows:

|  | °C. | $a$ |
|---|---|---|
| 3-methyl butene-1 | 21.2 | 1.52 |
| Pentene-1 | 30.2 | 1.06 |
| 2-methyl butene-1 | 31.1 | 1.03 |
| Isoprene | 34.1 | 1.00 |
| Trans-pentene-2 | 35.9 | 0.93 |
| n-Pentane | 36.0 | 0.92 |
| Cis-pentene-2 | 37.0 | 0.91 |
| 2-methyl butene-2 | 38.4 | 0.88 |
| Cyclopentadiene | 41.0 | 0.83 |
| Trans-piperylene | 41.9 | 0.77 |
| Cis-piperylene | 43.9 | 0.75 |
| Cyclopentene | 44.1 | 0.73 |
| Cyclopentane | 49.5 | 0.67 |

It is to be noted that the boiling points and the relative volatilities of the various $C_5$ compounds do not follow the degree of chemical unsaturation of the compounds. Upon the basis of normal vapor pressure therefore, extremely expensive equipment would be required to effect the separation of a simple mixture of several individual constituents. Moreover, if a fractional distillation were to be made upon a general mixture of $C_5$ hydrocarbons to separate close-boiling fractions, prolonged heating under high reflux ratios is involved, and under such conditions, considerable polymerization occurs of the more unsaturated hydrocarbons. Thus, fractional distillation alone as a means for making a separation of hydrocarbons from complex mixtures is disadvantageous even in the laboratory.

It has now been found that two or more closely related constituents can be obtained in high purity from complex hydrocarbon mixtures by a unique combination of at least four processing steps. In such processing, the first and fourth steps involve careful fractional distillation, while the intermediate steps involve an extractive distillation, followed by an azeotropic distillation. Thus, processing according to the invention is the combination of:

(1) Fractional distillation of a suitable feed stock;
(2) Concentration of the desired constituents by an extractive distillation upon a selected fraction; then
(3) Separation by azeotropic distillation of the desired hydrocarbons in high concentration; and
(4) The purification of the desired hydrocarbons by fractional distillation.

The process of the invention resides not only in the combination of two fractional distillations with the extractive distillation and azeotropic distillation, but also clearly in the manner of combination. It is essential to achieve the desirable fractions in the first, second and third steps of the processing in order that the final step of fractional distillation may be effective. It is usual also in commercial practice to employ an additional general step, namely, the recovery of the various solvent liquids employed in the extractive distillation and azeotropic distillation, respectively. Such recovery processing is, however, residual rather than an essential feature of the processing according to the invention.

In order to give a better understanding of the invention, analysis of the processing in each of the essential steps is presented. In fractional distillation, separation of the constituents of a mixture is made upon the basis of differences, at varying temperatures, of the vapor pressures of the various compounds when in admixture one with the other. In extractive distillation and azeotropic distillation on the other hand, separation of the constituents in the mixture is based on the differences at different temperatures of the vapor pressures of selected groups of compounds in the presence of certain type liquids added to a fractional distillation system.

The presence of suitable liquids in extractive distillation and azeotropic distillation effects in different degrees positive deviations from Raoult's law; that is, the volatilities of the various compounds are greater in the presence of the added liquid than would be expected upon the basis of their normal vapor pressures. Thus, in the case of a hydrocarbon mixture containing paraffins, mono-olefins and diolefins, the added liquid modifies in different degrees the relative volatilities of the various type hydrocarbons. In an extractive distillation upon a narrow-boiling fraction with a polar type solvent, the paraffins will be the most volatile constituents; the mono-olefins less volatile; and the diolefins the least volatile. Thus, the following table indicates the relative volatility values of four $C_5$ hydrocarbons in the presence and absence of aqueous acetone:

| | No solvent | With 2 volumes of solvent |
| --- | --- | --- |
| Isoprene | 1.00 | 1.00 |
| n-Pentane | 0.92 | 1.43 |
| Pentene-2 (trans) | 0.92 | 1.30 |
| Cyclopentene | 0.71 | 0.95 |

It is such an effect under suitable conditions of pressure and concentration of the added liquid that contributes to the formation of azeotropic compositions.

In extractive distillation as distinct from azeotropic distillation, the added liquid is employed in substantially greater amounts, in order to exert the maximum effect upon the different groups of compounds. The amount of added liquid employed in an extractive distillation is greatly in excess of that which would form azeotropic mixtures in the system. Thus, the addition of an extraneous liquid in extractive distillation is related to, but very distinct from, the addition of a definite amount of the added liquid in an azeotropic distillation system.

Liquids suitable in extractive distillation are in general the stable organic liquids of high dielectric constant. The suitable materials are therefore the normally liquid polar organic compounds containing oxygen, nitrogen, sulfur and related elements. Suitable liquids also have the following characteristics:

(1) High solubility for the hydrocarbons;
(2) Marked effect on the relative volatility;
(3) Readily separable from the hydrocarbons by distillation or when azeotropes are formed by solvent extraction or other means;
(4) Sufficient volatility to permit stripping without requiring the use of high temperatures;
(5) Comparative stability when heated in the presence of hydrocarbons; and
(6) Commercial availability and non-corrosiveness.

In the case of the separation of the $C_5$ hydrocarbons from their admixture with other hydrocarbons, acetone, furfural, pyridine, the amines and their admixtures with water have been found to be particularly advantageous.

In the case of azeotropic distillation, the same type of liquids are suitable as solvents. In addition, however, the liquids should have the following characteristics:

(1) Ability to form minimum boiling azeotropes with the desired hydrocarbons;
(2) Readily separable from the hydrocarbons;
(3) Sufficient difference in volatility between the solvent and the azeotropes;
(4) Comparative stability when heated in the presence of hydrocarbons; and
(5) Commercial availability and non-corrosiveness.

Suitable liquids therefore for azeotropic distillation are the saturated ketones, the amines, the alcohols and their admixture with water.

In the separation of isoprene and trans-piperylene from a refinery cracked stock, the first step involves the careful fractionation in a multi-plate distillation equipment of a $C_5$ hydrocarbon fraction containing substantial amounts of these hydrocarbons; and rejecting as much as possible of the cyclopentene, cyclopentane and higher hydrocarbons. A suitable feed stock for isoprene and trans-piperylene is the refinery by-product distillate from the high temperature cracking of gas oil, virgin naphtha, kerosene and/or other suitable feed stocks. A typical debutanized stock from this source may contain about 7% isoprene and trans-piperylene.

A distillate of this material is first fractionated in a multi-plate distillation tower, so as to derive therefrom as overhead material, a relatively close-boiling $C_5$ fraction containing the isoprene and the piperylenes together with other diolefins, mono-olefins and paraffins; and, as a distillation residue, hydrocarbons of higher boiling points of $C_5$ to $C_9$ molecular content. In the first fractional distillation, separation as far as consistent with the feed supply is thus made of the distillate containing a high content of isoprene and trans-piperylene from the higher boiling $C_5$ hydrocarbons and hydrocarbons of $C_5+$ molecular content in the distillation residue. The closer boiling overhead fraction is then subjected to an extractive distillation. When aqueous acetone is employed as the solvent, the amount used is generally about twice the volume of the liquid hydrocarbon mixture flowing down through the tower. In the case of furfural on the other hand, the ratio is often as high as 7. In this extractive distillation, a vapor overhead product is taken which consists essentially of paraffins and mono-olefins of $C_5$ molecular content. The distillation residue is also controlled, so that the residue consists essentially of solvent suitable for recycling to the tower so as to maintain as high a solvent-to-hydrocarbon ratio as is advantageous for the processing. The most important fraction removed from the system is the intermediate distillate material suitably termed "the side stream product." This side stream product consists of isoprene and trans-piperylene with such quantities of cyclopentadiene and any higher boiling materials as were present in the feed, and also traces of liquid polymer product as have been formed during the extractive distillation operation. Both the overhead and side stream distillate fractions may contain substantial quantities of the added liquid as the result of the formation of azeotropic mixtures.

The side stream product from the extractive distillation is then passed to an azeotropic distillation system. The system is controlled so as to insure an overhead product consisting essentially of an azeotropic mixture of isoprene and solvent, and to obtain a side stream product consisting essentially of an azeotropic mixture of trans-piperylene, and as a distillation residue, excess solvent and small quantities of higher boiling hydrocarbons. The overhead product contains in addition to the isoprene azeotrope essentially all of the cyclopentadiene and the cyclopentene present in the feed. The side stream product, on the other hand, contains, in addition to the trans-piperylene azeotrope, such quantities of cyclopentane as have been carried through the system from the feed. The presence of the cyclic compounds in the side stream from the extractive distillation makes it extremely difficult to obtain relatively pure isoprene and trans-piperylene from a complex hydrocarbon mixture by the combination of fractional distillation and extractive distillation.

The overhead and side stream products are then separately treated so as to remove the solvent. When aqueous acetone is employed as the solvent, these distillate materials are usually countercurrently treated with water to remove the acetone and thus to permit the two hydrocarbons to be separated therefrom as separate streams. The isoprene and trans-piperylene, after separation of the aqueous liquid, are then fractionally distilled under carefully controlled conditions, so as to obtain as overhead products the respective hydrocarbons in substantial purity.

Since some polymerization, particularly of cyclopentadiene, normally occurs during the processing, high boiling polymeric materials are normally present in the solvent recycle. The polymerization reactions occurring within the system are of two kinds, namely, the formation of dimer and trimer polymers and the formation of high molecular weight semi-solids by complex polymerizing reactions. The former reaction cannot be suitably inhibited or controlled, but the latter reaction may be checked by the addition of certain inhibitor compounds. In order to prevent accumulation in the solvent of the high boiling liquids formed as a result of the dimer and trimer polymers, about 5% of the recycled solvent is generally removed and combined with the overhead distillate from the extractive distillation system; and the combined stream is then treated for solvent recovery.

The uniqueness of processing according to the invention is clearly brought out by the following arrangement of compounds according to the relative volatility values, α (isoprene as 1) of the various hydrocarbons normally present in a complex mixture of the $C_5$ hydrocarbons in normal extractive and azeotropic distillation systems:

cific example of a typical debutanized distillate stream has the following composition:

| | |
|---|---|
| Butenes | 0.5 |
| 3-methyl butene-1 | 0.5 |
| Pentene-1 | 9.4 |
| 2-methyl butene-1 | 2.0 |
| Isoprene | 4.1 |
| Trans-pentene-2 | 1.0 |
| N-pentane | 0.8 |
| Cis-pentene-2 | 1.0 |
| 2-methyl butene-2 | 2.2 |
| Cyclopentadiene | 1.3 |
| Trans-piperylene | 2.7 |
| Cis-piperylene | 0.2 |
| Cyclopentene | 2.1 |
| Cyclopentane | 0.1 |
| $C_6$ paraffins and olefins | 11.7 |
| Benzene | 11.7 |
| $C_7$ | 18.7 |
| $C_8$ | 9.8 |
| $C_9$ | 20.2 |

The feed stock is supplied to fractionating equipment 10 through line 11. Fractionating equipment 10 may be of any of the usual forms of fractionating devices, such as a column containing bubble cap plates. The equipment is operated usually at pressures somewhat above that of the atmosphere. In the diagram, equipment 10 is specifically shown as being a tower of multi-plate construction containing bubble cap plates. In normal operation of processing according to the invention, about 50 plates are present in such a tower. The tower is shown as being complete with an overhead vapor line 12, a condenser 13, a drum 14, a reflux line 15, a bottoms line 16, a reboiler 18 and a reboiler vapor line 19. The distillate product is withdrawn from the distillation system through line 21 and the bottoms product from the system through line 17. The pressure upon the system for the treatment of the specific composition given is maintained at about 25 lbs. pressure per square inch (gauge), in order to allow the employment of ordinary water for cool-

| Fractional distillation | | Extractive distillation with aqueous acetone | | Azeotropic distillation | |
|---|---|---|---|---|---|
| 3-methyl butene-1 | 1.12 | 3-methyl butene-1 | 1.59 | | |
| Pentene-1 | 1.06 | Pentene-1 | 1.53 | | |
| 2-methyl butene-1 | 1.03 | 2-methyl butene-1 | 1.49 | | |
| | | n-Pentane | 1.43 | | |
| | | Trans-pentene-2 | 1.30 | | |
| | | Cis-pentene-2 | 1.28 | | |
| | | 2-methyl butene-2 | 1.26 | | |
| Isoprene | 1.00 | Isoprene | 1.00 | Isoprene | 1.00 |
| Trans-pentene-2 | 0.93 | Cyclopentane | 0.97 | Cyclopentadiene | 0.96 |
| n-Pentane | 0.92 | Cyclopentene | 0.95 | Cyclopentene | 0.84 |
| Cis-pentene-2 | 0.91 | Cyclopentadiene | 0.82 | Trans-piperylene | 0.75 |
| 2-methyl butene-2 | 0.88 | Trans-piperylene | 0.77 | Cis-piperylene | 0.72 |
| Cyclopentadiene | 0.83 | Cis-piperylene | 0.75 | Cyclopentane | 0.70 |
| Trans-piperylene | 0.77 | | | | |
| Cis-piperylene | 0.75 | | | | |
| Cyclopentene | 0.73 | | | | |
| Cyclopentane | 0.69 | | | | |

Figure 1A:
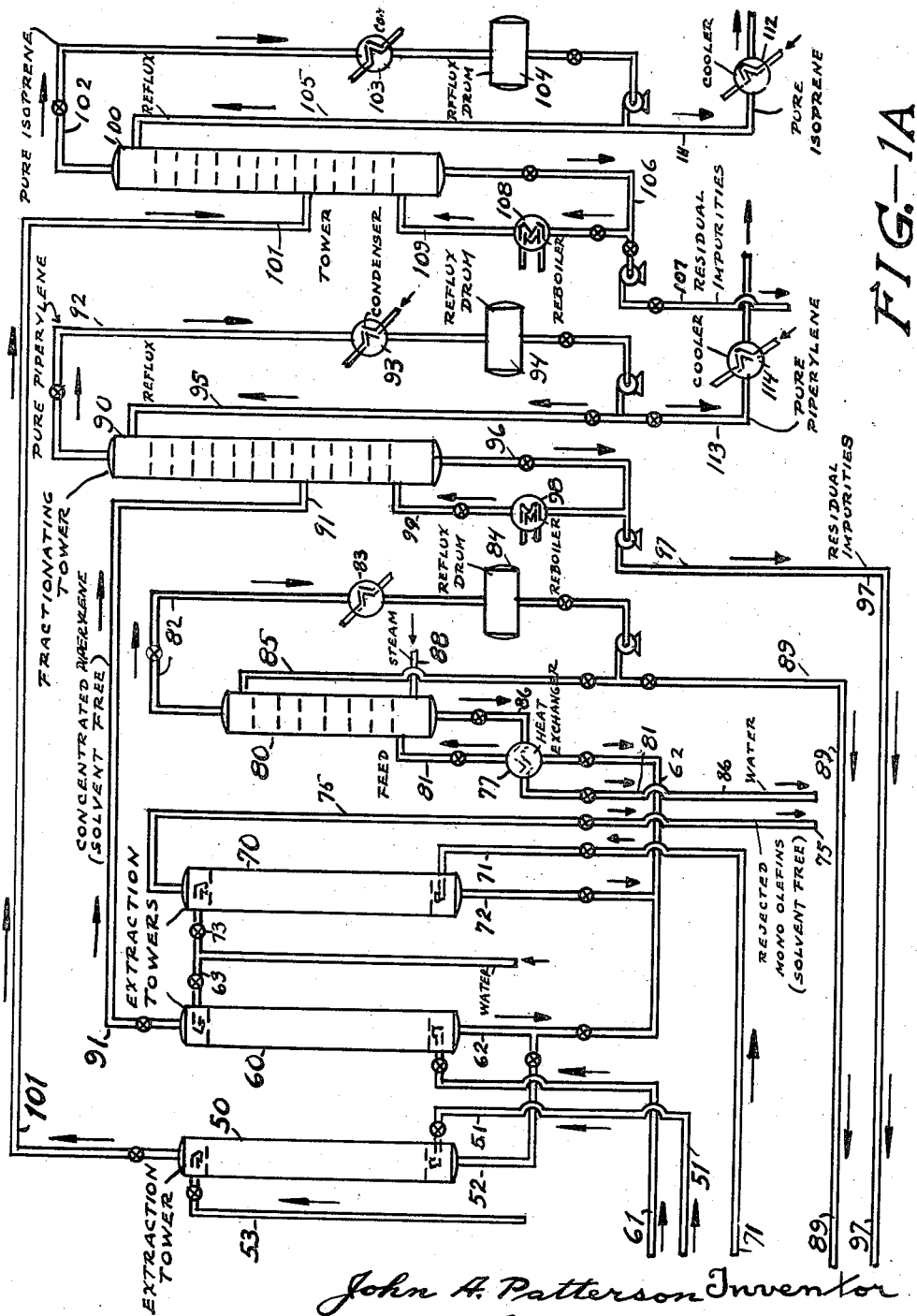

In order to illustrate the invention more clearly, the following detailed description of processing is presented. The reference numerals given in the description refer to the accompanying drawings, Figs. 1 and 1a, respectively. In these drawings, a suitable lay-out of equipment and indication of a suitable flow of materials for processing according to the invention are presented. In the illustration, example will be taken of the separation and purification of isoprene and trans-piperylene as obtained from the treatment of a debutanized distillate stream from the liquid phase cracking of a virgin gas oil stock. A speing purposes in the condenser 13. The degree of separation in tower 10 is controlled by the heat supply from the reboiler 18 and the ratio of reflux supplied through line 15. The percentage of feed taken as product through line 21 is adjusted so as to remove the major portion of the isoprene and trans-piperylene in this fraction, while rejecting in the residue higher boiling hydrocarbons of the $C_5$ to $C_9$ range. In the example used for illustration a reflux ratio of 3 is maintained, while taking off approximately 26% of the feed as distillate material. Under these conditions the temperature at the top of the tower is usually about 140° F., while the temperature at the exit of line 16 is about 275° F.

The overhead product removed through line 12 consists of a narrow C5 fraction containing the majority of the isoprene and piperylene in feed mixture. The entire distillate is condensed in equipment 13 and passed to the drum 14. From the drum 14 a quantity of reflux is passed through line 15 in order to maintain the desired operating conditions. The remainder of the condensed distillate is withdrawn from drum 14 and passed through line 21 for further processing. The ratio of reflux to product is between 3 and 5, depending on the feed stock. In the processing of the feed stock of the specific illustration, the composition of the distillate material under the particular operating conditions given shows the following analysis:

| | |
|---|---|
| C4 | 1.9 |
| 3-methyl butene-1 | 1.9 |
| Pentene-1 | 35.9 |
| 2-methyl butene-1 | 7.6 |
| Isoprene | 15.7 |
| Trans-pentene-2 | 3.8 |
| n-Pentane | 3.1 |
| Cis-pentene-2 | 3.8 |
| 2-methyl butene-2 | 8.0 |
| Cyclopentadiene | 4.6 |
| Trans-piperylene | 9.5 |
| Cis-piperylene | 0.4 |
| Cyclopentene | 3.8 |

The residual material, consisting largely of cyclopentane, some pentenes and higher boiling hydrocarbons is withdrawn through line 16. A portion of the residue is passed through the reboiler 18 where it is vaporized in order to supply the heat necessary in order to operate the tower, the vapor being returned to the tower 10 through line 19. The remainder of the higher boiling material is removed from the system through line 17.

The overhead fraction from tower 10 as removed through line 21 is passed to the fractionating tower 20. The tower 20 is similar in design to tower 10 and may be any type of suitable fractionating equipment, preferably a bubble plate tower containing 60 plates. It is furnished with an overhead vapor line 22, a condenser 23, a drum 24, a reflux line 25, a bottoms line 26, a reboiler 28 and a reboiler vapor line 29. The tower also has a solvent recycle line 27, a side stream vapor line 31 and a side stream return line 37. The distillate product is withdrawn through line 71 and combined with a portion of the solvent withdrawn from line 27 through line 76 and conducted to a tower 70. A portion of the recycled solvent from the bottom of the tower 20 which is withdrawn from line 27 through line 76 is made in order to remove some of the high boiling polymeric materials formed during processing from the less stable unsaturated hydrocarbons of the feed stock and thus to maintain the content of high boiling materials in the solvent recycle at a low value.

In the tower 70 the combined stream, after cooling in equipment 74, is countercurrently treated with water for recovery of the acetone. The tower 70 may be any suitable type of liquid-liquid contacting device in which countercurrent flow of materials may be maintained. In the present case the tower is packed with Raschig rings and sufficient pressure is maintained in the tower to prevent vaporization of any of the materials passing through the tower. The composite solution admitted through line 71 is introduced into the tower 70 near the bottom and passes upwards to the tower countercurrently to a stream of water introduced near the top through line 73. In passing through the tower, the solvent is extracted from the hydrocarbon material.

Any polymers or other high boiling material in solution in the recycled solvent which is combined with the distillate from tower 20 are extracted by the hydrocarbons of the distillate material. The hydrocarbons free of solvent are removed through line 75 at the top of the tower and discarded. The water extract, consisting of a dilute solution of acetone and water, is withdrawn through line 72 at the bottom of the tower and, after being combined with similar extracts from towers 50 and 60, is transferred through line 81 through heat exchanger 77 and line 81 to a solvent recovery tower 80.

The quantity of water employed in the tower 70 is determined by the partition of solvent between the hydrocarbon and water and the efficiency of the contacting devices in the extracting tower 70. For the specific composition of this illustration, a volume ratio of water to combined solution of approximately 1 is maintained.

The bottoms product from tower 20 is withdrawn through line 27 and recycled to the tower. Pressure upon the system is maintained at about 25 lbs. per square inch (gauge) in order to have a workable condensing temperature similar to that in connection with fractionating equipment 10. The overhead distillate vapor removed from line 22 consists of azeotropic mixtures of C5 olefins and paraffins when aqueous acetone is employed as the solvent material admitted through line 29. The vapors are condensed in equipment 23 and passed to the drum 24. A portion of the condensate is returned through line 25 as reflux while the remainder is withdrawn through line 71 and through cooler 74 to the tower 70.

The quantity of aqueous acetone recycled through line 27 to the distillation system is, for the particular composition of feed stock given, in the ratio of solvent to hydrocarbon mixture of 3 to 1 from the point of introduction to the plate upon which the side stream is withdrawn. Below the plate from which the side stream product is withdrawn the solvent is stripped of its hydrocarbon content. The bottoms withdrawn through line 26 consists of relatively pure solvent. A portion of the bottoms liquid is passed through the reboiler 28 where it is vaporized, the vapor being returned to tower 20 through the vapor line 29 to supply the heat necessary to operate the tower. The remainder of the solvent, except for the small portion withdrawn for purification, is conducted through cooler 47 on line 27 to the upper portion of the tower 20. Thus, the major part of the solvent continuously recycles within the extractive distillation system.

The degree of separation of the hydrocarbons taking place in the extractive distillation system is dependent upon two functions, namely, the ratio of solvent to hydrocarbon liquid on the plates and the ratio of liquid to vapor flowing through the tower. The ratio of solvent to hydrocarbon is controlled by the rate of solvent recirculation. The ratio of liquid to vapor in the zone of high solvent to hydrocarbon ratio, that is, between the solvent inlet and side stream outlet, is controlled by the reflux returned through line 25 from drum 24. Due to considerable difference in solvent concentration between the top of the tower and the extractive distillation zone and the difference in latent heat of the constituents, the reflux ratio and consequently the ratio of liquid to vapor at the top of the tower, must be appreciably higher than the liquid to vapor ratio in the extractive distillation zone. Thus, in the case of the specific example of this illustration, the liquid to vapor ratio in the extractive distillation zone is 0.80, while the ratio at the top of the tower is 0.85, the latter being equivalent to a reflux ratio of 5.5.

The heat necessary for the extractive distillation operation, as well as to concentrate the hydrocarbon fractions and to strip the solvent, is supplied completely from the reboiler 28. In this manner, considerable heat economy is effected, since the heat to operate the extractive distillation tower is supplied by condensation of the solvent at the top of the solvent stripping section of the tower. If this were not done, a condenser would have to be provided for the solvent stripper in order to supply the reflux necessary for operation and additional heat would be required to operate the extractive distillation system. Moreover, by maintaining the proper adjustment of the amounts of the vapor removed through line 31, and consequently the amount of liquid returned through line 37, adequate reflux is obtained in the bottoms stripping section of the tower 20, thus insuring complete stripping of the solvent. In the same way, the condensation needed to produce the required reflux in the extractive distillation zone is obtained by supplying the heat required to concentrate the paraffins and mono-olefins at the top of the tower 20.

The vapor side stream removed through line 31 contains a high concentration of isoprene and trans-piperylene with small amounts of olefins and other diolefins in the presence of solvent in an amount in equilibrium with 75% molar concentration of solvent on the plates of the extractive distillation tower 20. The volume of solvent is about 50% of the vapor mixture. This side stream material withdrawn through line 31 is conducted to the distillation tower 30. The tower 30 may be any suitable fractionating device such as a tower provided with bubble cap plates as previously described in connection with tower 20.

The tower 30 is provided with an overhead vapor line 32, a condenser 33, a drum 34, a reflux line 35, a bottoms line 36, a reboiler 38, a reboiler vapor line 39, a bottoms withdrawal line 37, a side stream vapor line 41 and a side stream return line 46 in addition to the vapor inlet line 31. The overhead distillate removed through line 32 consists essentially of the azeotropic mixture of isoprene, acetone and water. This overhead distillate also contains lesser amounts of the azeotropic compositions of cyclo-pentadiene and cyclo-pentene with water and acetone: the amounts of cyclo-pentadiene and cyclo-pentene being in such quantities as were not rejected in equipment 10. The vapor is condensed in equipment 33 and conducted to the drum 34. A portion of the condensate is returned to the tower 30 through line 35 as reflux, while the remainder is withdrawn through line 51 to water scrubbing tower 50. As a side stream product removed through line 41, a mixture consisting essentially of trans-piperylene, acetone and water is separated from the system and passed to tower 40.

The tower 40 is any form of equipment suitable for fractional distillation, such as a bubble plate tower. In the case of the illustration, the tower 40 contains about 10 bubble cap plates. It is equipped with overhead vapor line 42, condenser 43, drum 44, reflux line 45 and a bottoms withdrawal line 46. The equipment is also furnished with a product withdrawal line 61 in addition to the vapor feed line 41. Heat is supplied to the tower 40 by means of the vapor feed entering through line 41.

The distillate vapor withdrawn from tower 40 through line 42 is condensed in equipment 43 and collected in drum 44. A portion of the condensate is returned as reflux through line 45 while the remainder is withdrawn through line 61 to a tower 60 for removal of the acetone. The bottoms, consisting of acetone and water and containing some piperylene and other hydrocarbons from the feed, are withdrawn through line 46 and returned to the tower 30 for recovery of the solvent. The tower 60 is a liquid-liquid contacting device similar to tower 70, in which the hydrocarbon is countercurrently treated with water admitted near the top of the tower through line 63 for the removal of acetone. The solvent-free hydrocarbon is withdrawn from the top of the tower and conducted through line 91 to the tower 90. The dilute solution of acetone in water is removed from the bottom of the tower through line 62 and combined with similar solutions from towers 50 and 70.

The reflux ratio used in the tower 30 is adjusted so as to obtain an overhead product consisting of the azeotropic mixture of isoprene, acetone and water with the cyclopentene and cyclopentadiene which were present in the feed to tower 30. The side stream product consists of transpiperylene, acetone and water in addition to higher boiling hydrocarbon materials. Thus, the reflux ration in the tower 30 is determined by the nature of the specific operating requirements. In the example of this illustration, a reflux ratio of 10 is maintained at the top of the tower 30 in order to supply adequate reflux for the bottom solvent stripping section of the tower 20.

In the operation of the system comprising towers 20, 30 and 40 and their auxiliaries, separation into zones is clearly defined by the various temperature ranges. Thus, the vapor leaving the top of the tower 20 is about 140° F. The temperature rises sharply to about 155° F. between the top of the tower and the plate on which the solvent is admitted through line 27, then rises very slowly to 160° F. on the plate where the side stream is withdrawn through line 31. Below the plate from which the side stream is withdrawn, as a result of the concentration of the aqueous acetone, the temperature rises sharply to 208° F. prevailing at the bottom of the tower. The temperature at the top of the tower 30 is about 147° F. In the tower 30 above the point of introduction of the vapor stream through line 31 the temperature drops rapidly from about 160° F. to about 145° F. due to the concentration of the azeotropic mixture of isoprene, acetone and water. Between this point and that of the withdrawal of the side stream through line 41, the temperature rises to about 160° F. Below this latter point the temperature again rises due to the concentration of the solvent to about 200° F. In the tower 40 the temperature gradient is of the same general character as that occurring in the concentrating section of the tower 30.

The isoprene-acetone-water azeotropic mixture removed as distillate from the tower 30 through line 51 is conducted to water scrubbing equipment 50. Equipment 50 may be any suitable type of liquid-liquid contacting device in which countercurrent flow of materials may be maintained. The tower in the present case is packed with Raschig rings and sufficient pressure is maintained therein to prevent vaporization of any of the materials passing through the tower. The stream removed from the azeotropic distillation system through line 51 is admitted to the bottom of the tower 50 through a distributing device and then allowed to flow upward countercurrently to the stream of water admitted to the tower through line 53. In passing through the tower, the acetone is removed from the hydrocarbon and thus completely freed of the solvent employed in the azeotropic distillation. The quantity of water employed is determined by the partition of the solvent between the hydrocarbon and water and the efficiency of the contacting devices in the extracting equipment 50. For the specific composition of this illustration, a volume ratio of water to distillate of approximately 1 is maintained.

Passing overhead from the tower 50 through line 101 is partially purified isoprene in high concentration. Impurities present in this stream consist of cyclo-pentadiene and cyclo-pentene and any other water-insoluble materials contained in the distillate from tower 30. The water extract removed from the tower through line 52 consists of a dilute solution of acetone in water. This extract is combined with the other dilute solutions of acetone from the towers 60 and 70, similar in character to tower 50. The combined mixture is treated for recovery of the acetone in tower 80.

The solvent-free isoprene concentrate from the tower 50 is conducted through line 101 to the fractionating tower 100. This tower may be any suitable device for effecting fractional distillation. For the specific composition of the example of this illustration, a tower containing 50 bubble cap plates is employed. The tower 100 is provided with an overhead vapor line 102, a condenser 103, a drum 104, a reflux line 105 and a bottoms withdrawal line 106, a reboiler 108 and a reboiler vapor return line 109. The distillate product is withdrawn through line 111 and through cooler 112. The bottoms product is withdrawn through line 107. Pressure upon the system is maintained so as to effect satisfactory condensation with ordinary water in the condenser 103. In the specific example of this illustration, the pressure maintained upon the tower 100 is between 12 and 15 lbs. per square inch (gauge) and a reflux ratio of 12 is maintained.

The distillate withdrawn through line 102 consists of highly purified isoprene. The distillate is condensed in equipment 103 and the condensate conducted to the drum 104. A portion of the condensate is returned to tower 100 as reflux through line 105. The remainder of the condensate is withdrawn as product through line 111, cooled in equipment 112 and transferred to storage.

The bottoms from the tower 100, consisting of cyclo-pentadiene and cyclo-pentene in addition to any polymer or other high boiling constituents of the feed to the tower and containing only traces of isoprene, is withdrawn through line 106. A portion of the material is passed to the reboiler 108 where it is vaporized, the vapors being returned to the tower 100 through line 109 to supply the heat necessary to operate the tower. The remainder of the bottoms are removed through line 107 and discarded.

Similar to tower 100 is tower 90. Tower 90 is similarly equipped as tower 100 with vapor overhead line 92, condenser equipment 93, drum 94, reflux line 95, bottoms line 96, reboiler 98, reboiler return line 99, bottoms withdrawal line 97 and a product withdrawal line 113, in addition to the feed line 91. Thus, taken overhead from the tower 90 is substantially pure piperylene through line 92, to condenser 93 and thence to drum 94. Portion of the condensate is passed through line 95 as reflux to the tower 90, while the remainder is withdrawn through line 113 through cooler 114 to storage. The bottoms withdrawn through line 96 consist of any cyclo-pentane from the feed stock in addition to other high-boiling impurities and some piperylene. Portion of the bottoms is passed through reboiler 98 where it is vaporized and returned through line 99 to the tower 90 to supply the heat necessary to operate the tower. The remainder of the bottoms is withdrawn through line 97 and recycled to the feed tower 10 for the recovery of its piperylene content. By increasing the number of plates in tower 90 or increasing the reflux ratio, all of the piperylene may be taken overhead as purified product. It has been found, however, more efficient to reject a small amount of piperylene to the bottoms and recycle same for recovery, by recycling to the feed tower 10. A reflux ratio of 10 is maintained for the desired separation in tower 90.

Recovery of acetone is made from the various solutions from towers 50, 60 and 70 by passing to tower 80. The tower 80 may be any convenient device for effecting fractional distillation such as a tower containing 20 bubble cap plates. It is provided with an overhead vapor line 82, a condenser 83, a drum 84, a reflux line 85, a bottoms withdrawal line 86 and a steam line 88. The distilled product is withdrawn through line 89 and the bottoms through line 86. The distillate from the tower 80 consists of relatively pure acetone. The tower is operated at about atmospheric pressure. The distillate vapors pass through line 82 to the condenser 83 and thence to drum 84. A portion of the condensate is returned to the tower 80 through line 85, while the remainder is withdrawn through line 89 and thence through line 27 where it combines with the solvent admitted to the tower 20. Heat is supplied to the tower 80 by means of the steam line 88, through which open steam is injected directly into the bottom of the tower. The bottoms comprising the major part of the water content of the feed and the condensed steam is withdrawn through line 86 through the heat exchanger 77 and then discarded. The heat exchanger 77 is also utilized to heat the feed to the tower 80. Thus, the sensible heat of the bottoms is utilized.

The reflux return to the tower 80 through line 85 is controlled at such a rate that the water content of the distillate passing through line 82 and consequently the product returned to the tower 30 through lines 89 and 27, is the same as the recycled solvent to the tower 20. By proper adjustment of the reflux ratio in tower 80, the water content of the product may be varied to correct the variations in water content of the solvent in tower 20. Normally, a reflux ratio of about 0.5 is maintained in the tower 80.

What is claimed is:

1. The process of separating at least two hydrocarbons of closely related properties from a complex mixture which comprises fractionating the complex hydrocarbon mixture to obtain as distillate material a narrow-boiling fraction containing the desired hydrocarbons, subjecting the resultant distillate fraction to an extractive distillation to separate therefrom a distillate material containing the desired hydrocarbons in high concentration, then subjecting the said distillate material to an azeotropic distillation to separate the desired hydrocarbons and fractionally distilling the resultant distillate product.

2. The process according to claim 1, in which the feed stock is a debutanized refinery cracked stock and the said several distillation steps are made thereon to separate $C_5$ diolefin hydrocarbons.

3. The process for separating at least two $C_5$ unsaturated hydrocarbons of closely related properties from a refinery cracked stock containing the unsaturated hydrocarbons in less than 10% concentration, which comprises fractionally distilling the said stock to separate a distillate fraction containing the $C_5$ unsaturated hydrocarbons in higher concentration, subjecting said distillate fraction to an extractive distillation in the presence of a solvent having a substantial effect upon the relative volatilities of hydrocarbons to separate therefrom a distillate material containing the desired $C_5$ unsaturated hydrocarbons in high concentration, then subjecting the said distillate material to an azeotropic distillation to separate the desired hydrocarbons and then fractionally distilling the resultant distillate products to purify the individual unsaturated hydrocarbons.

4. The process according to claim 3 in which the solvent employed in the extractive and azeotropic distillations comprises acetone.

5. The process according to claim 3 in which the solvent employed in the extractive distillation comprises acetone and the solvent employed in the azeotropic distillation comprises a monohydric alcohol.

6. The process for separating isoprene and trans-piperylene from a debutanized refinery cracked stock of about 5 to 10% isoprene and trans-piperylene content, which comprises fractionally distilling the debutanized refinery cracked stock to separate a distillate fraction containing the isoprene and trans-piperylene in from 15 to 30% concentration, subjecting the resultant distillate fraction to an extractive distillation in the presence of a solvent having a substantial effect on the relative volatilities of the hydrocarbons present in the distillate material supplied to the extractive distillation system, separating a distillate material from the extractive distillation system containing isoprene and trans-piperylene in high concentration, then subjecting the said distillate material to an azeotropic distillation to separate as overhead an azeotrope containing isoprene, and as a side stream a distillate product consisting essentially of an azeotrope containing trans-piperylene and fractionally distilling the respective fractions to separate the isoprene and trans-piperylene.

7. The process according to claim 6, in which the solvent employed in the extractive and azeotropic distillations comprises acetone.

8. The process according to claim 6, in which the solvent employed in the extractive and azeotropic distillations is aqueous acetone.

9. The process according to claim 6, in which the solvent employed in the extractive distillation comprises pyridine and the solvent employed in the azeotropic distillation is an alcohol.

JOHN A. PATTERSON.